US012657670B2

(12) United States Patent
Lee et al.

(10) Patent No.: US 12,657,670 B2
(45) Date of Patent: Jun. 16, 2026

(54) KEY POINT SMOOTHING METHOD BASED ON FRAME UP-SAMPLING

(71) Applicant: Korea Electronics Technology Institute, Seongnam-si (KR)

(72) Inventors: Young Han Lee, Seongnam-si (KR); Choong Sang Cho, Seongnam-si (KR); Tae Woo Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 264 days.

(21) Appl. No.: 18/395,834

(22) Filed: Dec. 26, 2023

(65) Prior Publication Data

US 2025/0191140 A1     Jun. 12, 2025

(30) Foreign Application Priority Data

Dec. 11, 2023     (KR) ......................... 10-2023-0178605

(51) Int. Cl.
*G06V 40/16*         (2022.01)
*G06T 3/40*          (2006.01)
(Continued)

(52) U.S. Cl.
CPC .................. *G06T 5/70* (2024.01); *G06T 3/40* (2013.01); *G06V 40/168* (2022.01); *G10L 25/57* (2013.01); *G06T 2207/10016* (2013.01); *G06T 2207/20032* (2013.01); *G06T 2207/20081* (2013.01); *G06T 2207/30201* (2013.01); *G06V 20/46* (2022.01)

(58) Field of Classification Search
CPC ... G06T 5/70; G06T 3/40; G06T 2207/10016; G06T 2207/20032; G06T 2207/20081;

G06T 2207/30201; G06T 2207/20182; G06V 40/168; G06V 20/46; G06V 20/49; G10L 25/57; G10L 21/055

See application file for complete search history.

(56)          References Cited

U.S. PATENT DOCUMENTS 6,330,023  B1 *  12/2001   Chen .................. H04N 21/4341
                                                                    704/E21.02
9,794,092  B1 *  10/2017   Isautier .............. H04B 10/6161
(Continued)

FOREIGN PATENT DOCUMENTS

KR      10-2021-0140762  A      11/2021

OTHER PUBLICATIONS

Korean Office Action issued on Apr. 1, 2025, in corresponding Korean Patent Application No. 10-2023-0178605. (3pages in English, 5pages in Korean).

(Continued)

*Primary Examiner* — Juan M Guillermety
(74) *Attorney, Agent, or Firm* — NSIP Law

(57)          ABSTRACT

There is provided a frame up-sampling-based key point smoothing method. The key point smoothing method according to an embodiment up-samples frames based on which key points are extracted, and smooths the up-sampled frames. Accordingly, key points are generated by smoothing key point extraction frames after up-sampling, so that a time-series error occurring when key points are extracted can be reduced and time-series stability can be enhanced, and quality of an application service provided subsequently can be improved.

9 Claims, 5 Drawing Sheets

(51) Int. Cl.
    G06T 5/70        (2024.01)
    G06V 20/40      (2022.01)
    G10L 25/57       (2013.01)

(56)           References Cited

U.S. PATENT DOCUMENTS

| | | | | |
|---|---|---|---|---|
| 12,184,923 | B2 * | 12/2024 | Zhang | G06V 40/171 |
| 2009/0022226 | A1 * | 1/2009 | Bang | H04N 19/51 |
| | | | | 375/E7.19 |
| 2019/0178814 | A1 * | 6/2019 | Nakano | G01S 17/08 |
| 2020/0302969 | A1 * | 9/2020 | Boyd | G06V 20/49 |
| 2021/0295016 | A1 * | 9/2021 | Yan | G06V 20/46 |
| 2022/0222968 | A1 * | 7/2022 | Cower | G06V 40/172 |
| 2023/0147584 | A1 * | 5/2023 | Asgekar | H04L 65/1083 |
| | | | | 382/103 |
| 2025/0131599 | A1 * | 4/2025 | Chen | G06N 3/045 |

OTHER PUBLICATIONS

Szeto, Ryan, et al. "HyperCon: Image-to-video model transfer for video-to-video translation tasks." Proceedings of the IEEE/CVF Winter Conference on Applications of Computer Vision, 2021. (pp. 3079-3088).

* cited by examiner

KEY POINT SMOOTHING METHOD BASED ON FRAME UP-SAMPLING

CROSS-REFERENCE TO RELATED APPLICATION(S) AND CLAIM OF PRIORITY

This application is based on and claims priority under 35 U.S.C. § 119 to Korean Patent Application No. 10-2023-0178605, filed on Dec. 11, 2023, in the Korean Intellectual Property Office, the disclosure of which is herein incorporated by reference in its entirety.

BACKGROUND

Field

The disclosure relates to key point generation, and more particularly, to a method for smoothing key points to reduce a time-series error of key points in extracting and using facial key points.

Description of Related Art

When facial key points are extracted from a video, extraction is performed substantially on a frame basis. Since key point extraction is based on a prediction technology, errors do not occur with the same value in each frame. Therefore, when extracted key points are observed in time series, there may be an error where data consistently fluctuates.

If an application service is performed by using extracted key points without solving this problem, there may be a problem that a result consistently fluctuates, and, when a service is provided, accuracy or quality may be degraded, and, when key points are used as training data, training performance may be degraded. Accordingly, there is a demand for a solution to solve these problems.

SUMMARY

The disclosure has been developed in order to solve the above-described problems, and an object of the disclosure is to provide, as a solution for reducing a time-series error occurring when key points are extracted and thus enhancing time-series stability, a method of generating key points by smoothing key point extraction frames after up-sampling.

According to an embodiment of the disclosure to achieve the above-described object, a key point generation method may include: a step of extracting key points on a frame basis; a step of up-sampling frames based on which the key points are extracted; and a step of smoothing the up-sampled frames.

The step of smoothing may include smoothing a predetermined number of frames at predetermined intervals.

The predetermined interval may be determined based on a frame rate before up-sampling.

The predetermined number may be determined based on an increase rate of a frame rate caused by up-sampling.

The step of extracting may include extracting facial key points.

According to the disclosure, the key point generation method may further include a step of acquiring a speech signal, and the step of extracting may include extracting facial key points from the acquired speech signal on a frame basis.

The step of extracting may include inputting a speech signal to a machine learning model that is trained to extract facial key points from a speech signal, and extracting the facial key points.

The step of smoothing may be performed to reduce a time-series error of key points.

The key point generation method may further include a step of providing an application service by using the smoothed key point extraction frames.

According to another aspect of the disclosure, there is provided a key point generation system including: an extraction unit configured to extract key points on a frame basis; an up-sampling unit configured to up-sample frames based on which the key points are extracted; and a smoothing unit configured to smooth the up-sampled frames.

According to still another aspect of the disclosure, there is provided a key point smoothing method including: a step of up-sampling frames based on which key points are extracted; and a step of smoothing the up-sampled frames.

According to yet another aspect of the disclosure, there is provided a key point smoothing system including: an up-sampling unit configured to up-sample frames based on which key points are extracted; and a smoothing unit configured to smooth the up-sampled frames.

As described above, according to embodiments of the disclosure, key points are generated by smoothing key point extraction frames after up-sampling, so that a time-series error occurring when key points are extracted can be reduced and time-series stability can be enhanced, and quality of an application service provided subsequently can be improved.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
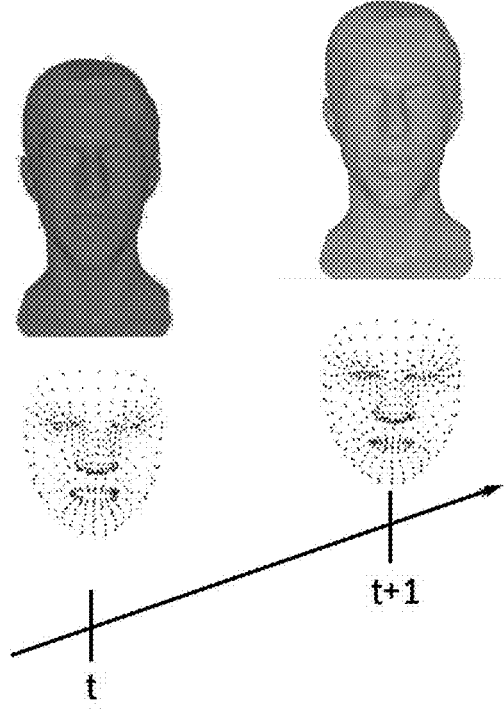
FIG. 1 is a view illustrating a key point extraction process.

FIG. 1 is a view illustrating a key point extraction process. When key points are extracted from a video, there may be a time-series error where positions of key points vary from frame to frame although the same key point should be positioned in the same position. Such a time-series error is not so great that it is difficult to analyze a result of a single image, but may degrade accuracy or quality of services when a video is analyzed or generated.

Figure 2:
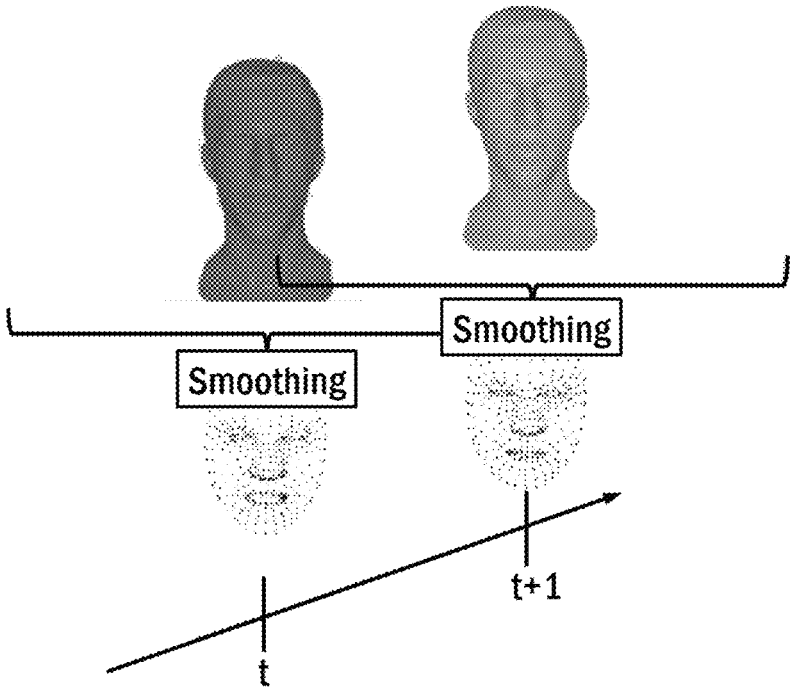
FIG. 2 is a view illustrating a key point smoothing process.

FIG. 2 is a view illustrating a key point smoothing process. As shown in FIG. 2, when smoothing is performed by using frames of neighboring time zones, a time-series error of key points may be reduced. In this case, it should be noted that smoothing is also performed for information on minute motions. When a smoothing period is larger than an expression period of a person, minute motion information or facial expression information may be concealed with a time-series error.

Embodiments of the disclosure provide a frame up-sampling-based key point smoothing method. The disclosure relates to a technology for reducing a time-series error of key points by smoothing after increasing a frame rate, as a solution for reducing a time-series error which may occur due to frame-based key point extraction in extracting and using facial points.

Figure 3:
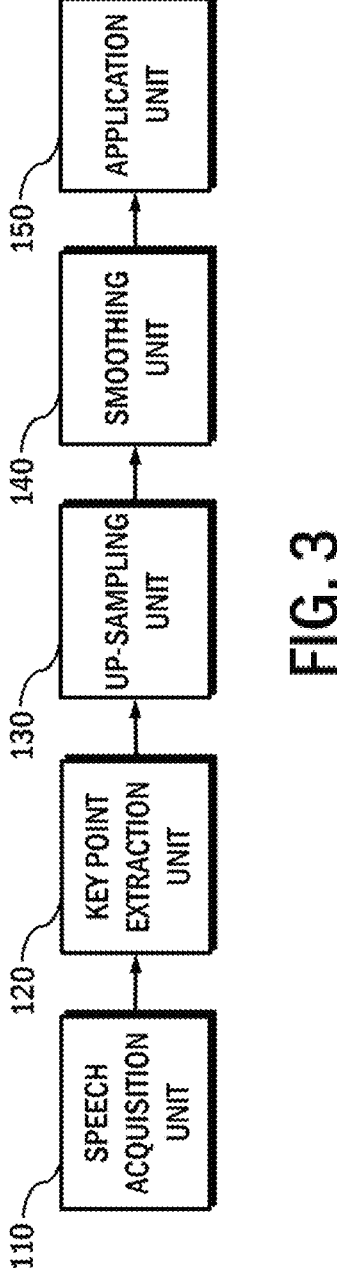
FIG. 3 is a view illustrating a key point generation system according to an embodiment of the disclosure.

FIG. 3 is a view illustrating a configuration of a key point generation system according to an embodiment of the disclosure. As shown in FIG. 3, the key point smoothing system according to an embodiment may include a speech acquisition unit 110, a key point extraction unit 120, an up-sampling unit 130, a smoothing unit 140, and an application unit 150.

The speech acquisition unit 110 is configured to acquire a speech signal from a user, and may be implemented by using a microphone or the like.

The key point extraction unit 120 extracts facial key points from the speech signal acquired through the speech acquisition unit 110 on a frame basis. To accomplish this, the key point extraction unit 120 may use a machine learning model that is trained to extract facial key points from a speech signal. A facial expression may be changed due to a voice utterance, and a change in the facial expression may cause a change in facial key points. Accordingly, machine learning technologies are being researched and developed to predict such a change.

Figure 4:
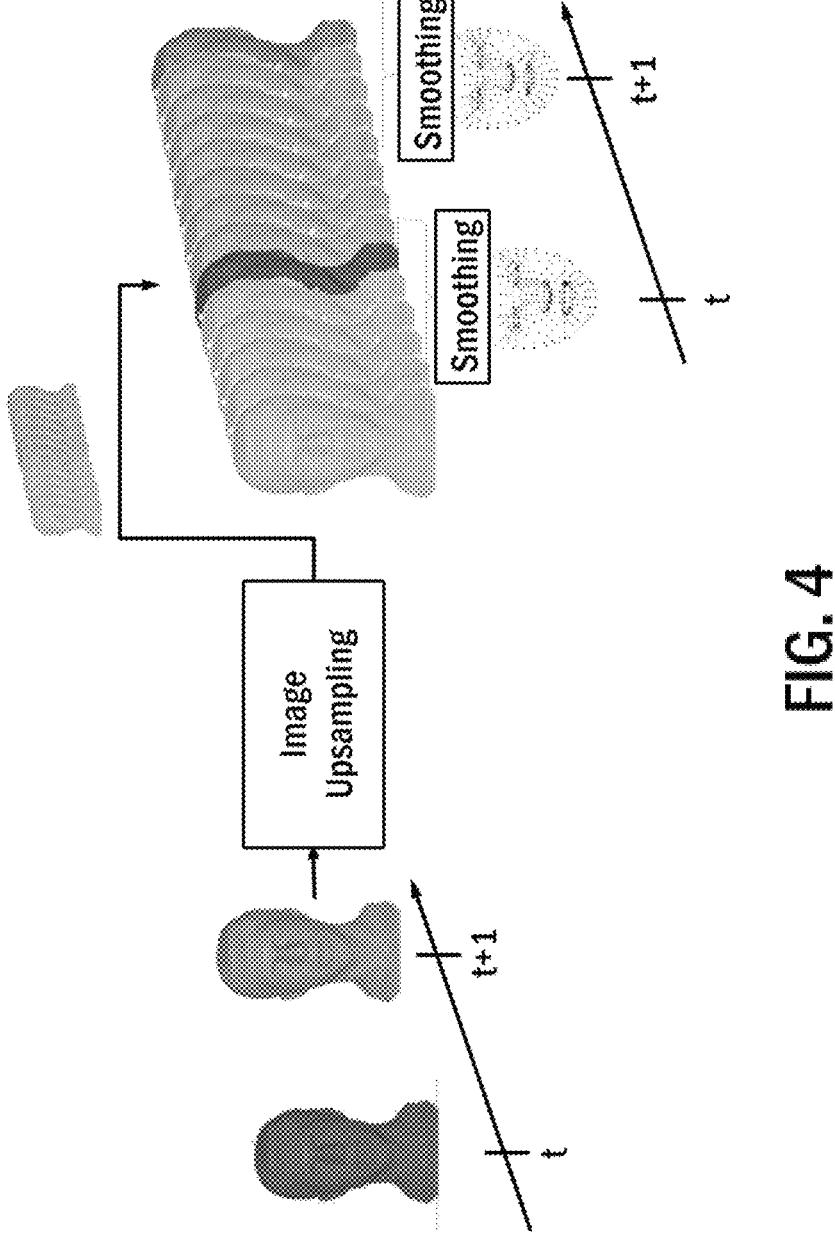
FIG. 4 is a view illustrating examples of a result of up-sampling key points and a result of smoothing.

The up-sampling unit 130 up-samples the frames based on which the facial key points are extracted by the key point extraction unit 120 on a time axis. FIG. 4 illustrates a result of up-sampling facial frames based on which key points are extracted by the up-sampling unit 130. As shown in FIG. 4, a frame rate may be increased by the up-sampling.

As an up-sampling method, frame-wise interpolation may be used. However, other methods may be used.

The smoothing unit 140 smooths the facial key point extraction frames which are up-sampled by the up-sampling unit 130 on a time axis. Smoothing is performed by statistically analyzing/calculating a predetermined number (a size of a smoothing window) of frames at regular intervals as shown in the right side of FIG. 4.

The regular interval is determined based on a frame rate before up-sampling is performed by the up-sampling unit 130. Specifically, smoothing is performed in every frame ( . . . , t−1, t, t+1, . . . ) before up-sampling. In this case, the frame rate increased by smoothing may be reduced back to an original frame rate. That is, smoothing by the smoothing unit 140 performs the role of down-sampling and may preserve a driving period of an original video.

The interval for smoothing does not need to be consistent with a frame rate before up-sampling, and may be determined by another value that is proportional to the frame rate before up-sampling.

In the above-described example, the predetermined number, that is, the number of frames to be smoothed, is determined based on an increase rate of the frame rate caused by up-sampling. For example, when the number of frames increases by 5 times due to up-sampling by the up-sampling unit 130, the predetermined number may be 5 or 10, or may be implemented by other values.

Smoothing by the smoothing unit 140 is for reducing a time-series error of key points extracted by the key point extraction unit 120, that is, for enhancing time-series stability of key points.

Smoothing may be performed by using median filtering or other methods.

The application unit 150 may provide various services by using the facial key point extraction frames which are smoothed by the smoothing unit 140. For example, the application unit 150 may generate a 2D/3D face model from the facial key point extraction frames and may provide an avatar service. In another example, the facial key point extraction frames which are smoothed may be used as training data.

Figure 5:
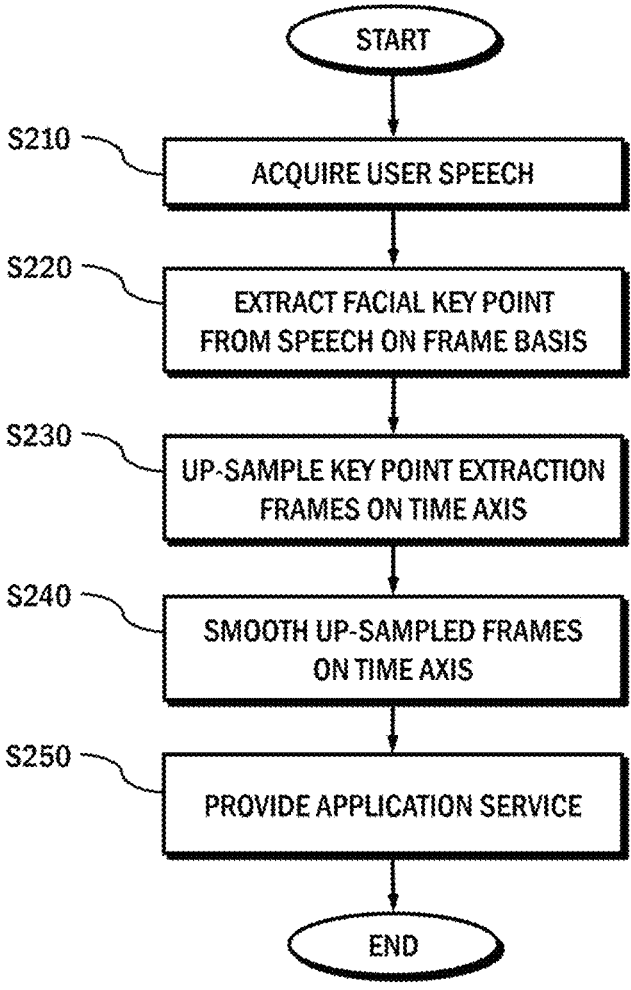
FIG. 5 is a view illustrating a key point generation method according to another embodiment of the disclosure.

FIG. 5 is a view illustrating a key point generation method according to another embodiment of the disclosure.

In order to generate key points, the speech acquisition unit 110 acquires a speech of a user (S210), and the key point extraction unit 120 extracts facial key points from the speech acquired in step S210 on a frame basis (S220).

The up-sampling unit 130 up-samples the frames based on which the facial key points are extracted in step S220 on a time axis (S230). The smoothing unit 140 smooths the facial key point extraction frames which are up-sampled in step S230 on a time axis (S240).

The application unit 150 provides various application services by using the facial key point extraction frames which are smoothed in step S240 (S250).

Up to now, a frame up-sampling-based key point smoothing method and a key frame generation method applying the same have been described with reference to preferred embodiments.

In the above-described embodiments, when key points are extracted on a frame basis, quality of the result of extracting may be enhanced and hence a service for developing an additional module by using key points may be stably performed.

In particular, a time-series error of key points is reduced, so that stability of key points on a time axis can be guaranteed, and an application service using the same can be provided with high accuracy.

In the above-described embodiments, smoothing is performed for key frames extracted from a face. However, the technical concept of the disclosure is applied to a case where key frames extracted from other body parts than the face are smoothed, and a case where key frames extracted from other objects than a human body are smoothed.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A key point generation method comprising:
extracting facial key points on a frame basis;
temporally up-sampling key point extraction frames based on which the facial key points are extracted on a time axis; and
smoothing the temporally up-sampled key point extraction frames on the time axis,
wherein the smoothing comprises smoothing a predetermined number of frames at predetermined intervals, wherein the predetermined interval is determined based on a frame rate before up-sampling, wherein the predetermined number is determined based on an increase rate of a frame rate caused by up-sampling, and wherein the method includes reducing a time-series error of the facial key points based on a result of the smoothing.

2. The key point generation method of claim 1, further comprising acquiring a speech signal,
wherein the extracting comprises extracting facial key points from the acquired speech signal on a frame basis.

3. The key point generation method of claim 2, wherein the extracting comprises inputting a speech signal to a machine learning model that is trained to extract facial key points from a speech signal, and extracting the facial key points.

4. The key point generation method of claim 1, further comprising providing an application service by using the smoothed key point extraction frames.

5. A key point generation system comprising:
one or more processors configured to:
extract facial key points on a frame basis;
temporally up-sample key point extraction frames based on which the facial key points are extracted on a time axis; and
smooth the temporally up-sampled key point extraction frames on the time axis,
wherein the smoothing comprises smoothing a predetermined number of frames at predetermined intervals, wherein the predetermined interval is determined based on a frame rate before up-sampling, wherein the predetermined number is determined based on an increase rate of a frame rate caused by up-sampling, and wherein the one or more processors are configured to reduce a time-series error of the facial key points based on a result of the smoothing.

6. The system of claim 5, wherein the one or more processors are further configured to acquire a speech signal and extract facial key points from the acquired speech signal on a frame basis.

7. The system of claim 6, wherein, for the extracting, the one or more processors are configured to input a speech signal to a machine learning model that is trained to extract facial key points from a speech signal, and extract the facial key points.

8. The system of claim 5, wherein the one or more processors are configured to provide an application service by using the smoothed key point extraction frames.

9. A key point smoothing method comprising:
temporally up-sampling key point extraction frames based on which facial key points are extracted on a frame basis on a time axis; and
smoothing the temporally up-sampled key point extraction frames on the time axis,
wherein the smoothing comprises smoothing a predetermined number of frames at predetermined intervals,
wherein the predetermined interval is determined based on a frame rate before up-sampling,
wherein the predetermined number is determined based on an increase rate of a frame rate caused by up-sampling, and
wherein the method includes reducing a time-series error of the facial key points based on a result of the smoothing.

* * * * *